Dec. 3, 1929.　　　　A. R. LONG　　　　1,737,599
INTERNAL COMBUSTION ENGINE
Filed July 2, 1924　　　3 Sheets-Sheet 1

INVENTOR
*Albert R. Long.*
BY
*Marshall & Hawley*
ATTORNEYS

Dec. 3, 1929.  A. R. LONG  1,737,599
INTERNAL COMBUSTION ENGINE
Filed July 2, 1924   3 Sheets-Sheet 2
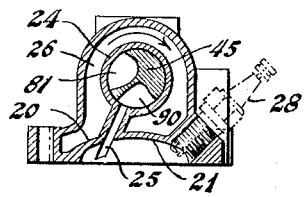
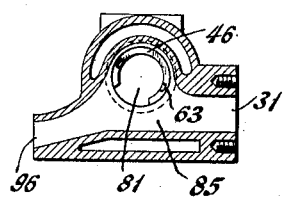
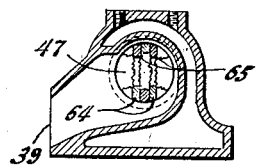
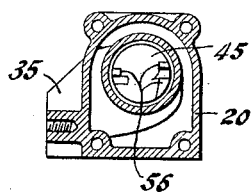
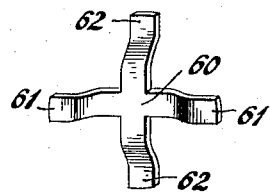
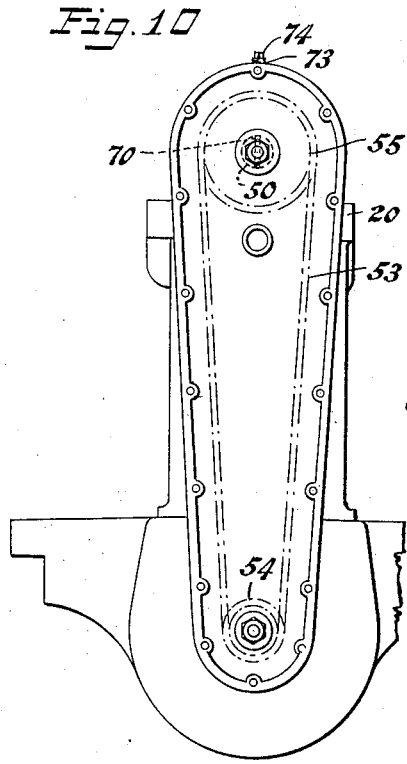
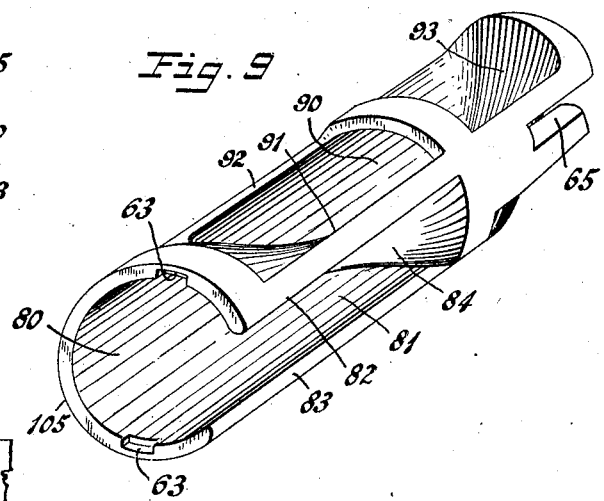
INVENTOR
Albert R. Long.
BY
Marshall + Hawley.
ATTORNEYS

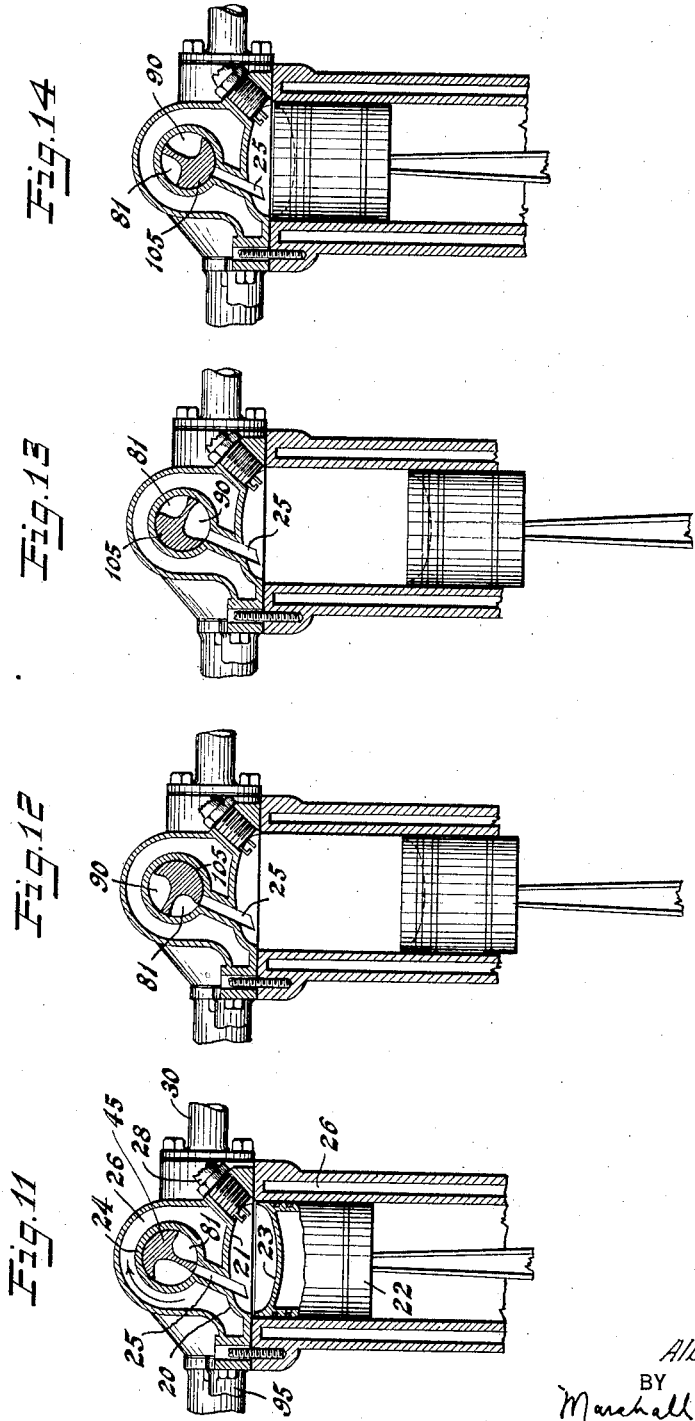

Patented Dec. 3, 1929

1,737,599

UNITED STATES PATENT OFFICE

ALBERT R. LONG, OF NEW YORK, N. Y., ASSIGNOR, BY MESNE ASSIGNMENTS, TO THE F. R. U. MOTORS CO., INC., OF NEW YORK, N. Y., A CORPORATION OF NEW YORK

INTERNAL-COMBUSTION ENGINE

Application filed July 2, 1924. Serial No. 723,635.

This invention relates to internal combustion engines.

The invention relates more particularly to valve structure for controlling the intake of the combustible mixture to the engine and the exhaust of the burnt gases therefrom.

For efficient operation of an internal combusion engine, the mixture must be thoroughly carbureted or atomized and the mixture of gas and air must be uniform or homogeneous. Furthermore, it is desirable that the path of mixture from the carburetor to the cylinders be as short as possible and be unobstructed. In this way the mixture will be moved at a uniform rate and will not be retarded during its passage from the carburetor to the engine cylinders.

This invention has for its salient object to provide a valve structure comprising a minimum number of parts and a structure that will be efficient and quiet in operation.

Another object of the invention is to provide valve structure so constructed and arranged that a close bearing surface will be maintained between the valve and the valve housing.

Another object of the invention is to provide a valve structure so constructed as to compensate for any tendency toward warping or distortion.

Another object of the invention is to provide an engine having the valve and ports thereof so relatively constructed and arranged that the passage of gas to the engine and the passage of the exhaust gas from the engine will be unimpeded and unobstructed.

Another object of the invention is to provide an engine so constructed as to promote turbulence of the mixture in the combustion chamber thereby effecting a thorough and uniform mixture of gas and air.

Another object of the invention is to provide valve structure so constructed and arranged that the valve can be easily and readily assembled and disassembled without requiring any dismantling of any other parts of the engine.

Another object of the invention is to provide valve structure so constructed and arranged that the timing of the valves is facilitated and the valves will be positively driven at all times.

Another object of the invention is to provide an engine having means for by-passing and volatilizing any unvolatilized portions of the mixture before these portions reach the combustion chambers of the engine.

Further objects of the invention will appear from the following specification taken in connection with the drawings, which form a part of this application, and in which Fig. 1 is a top plan view partly in section of an engine and valve structure constructed in accordance with the invention.

Fig. 4 is a transverse sectional elevation taken substantially on line 4—4 of Fig. 1.

Figure 1:
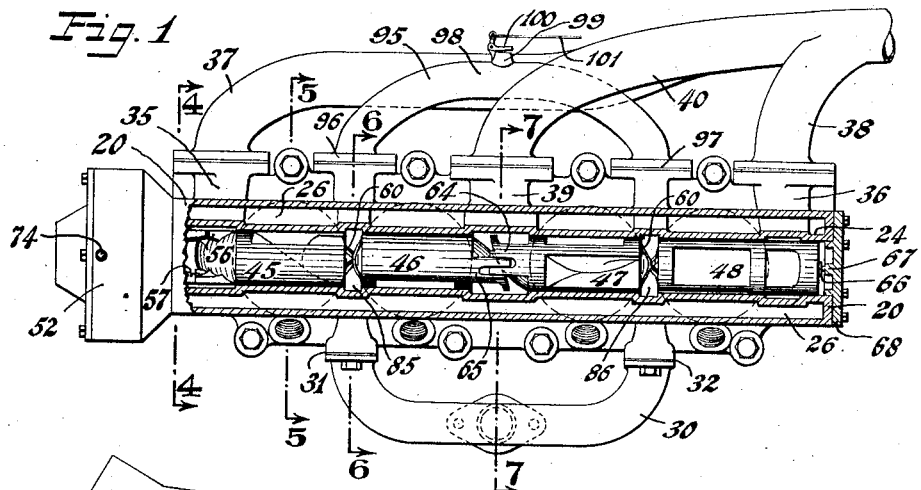

Figs. 5, 6 and 7 are transverse sectional elevations taken substantially on lines 5—5, 6—6 and 7—7 of Fig. 1.

Fig. 8 is a perspective view illustrating one form of coupling which may be used to connect certain of the valves.

Fig. 9 is a perspective view of one of the valves.

Fig. 10 is an elevational view showing one method of driving the valve shaft.

Figs. 11, 12, 13 and 14 are sectional elevations taken through the valve, valve housing and upper portion of the cylinder showing four positions of the valve.

Fig. 11 shows the position of the valve at the start of the intake stroke or end of the exhaust stroke.

Fig. 12 shows the position at the end of the intake or beginning of the compression stroke.

Fig. 13 shows the position at the end of the firing stroke or beginning of the exhaust stroke.

Fig. 14 shows the position at the end of the compression stroke or beginning of the firing stroke.

The invention briefly described as particularly worked out in the embodiment of the invention illustrated consists of an internal combustion engine comprising a plurality of cylinders, a valve housing mounted on the cylinders and preferably mounted above the cylinders and having ports communicating therewith and rotary valve mechanism mounted in the housing and adapted to establish communication between the intake manifold and the cylinders and between the cylinders and the exhaust manifold.

The valve mechanism comprises a plurality of valves or valve units, each valve having formed therein an intake passage for directing the intake gas into the cylinder port or port leading from the valve housing to the cylinder and a passage for directing the exhaust gas from the port into the exhaust manifold. These passages are so formed and the valves are so relatively arranged that the intake gas is led through one end of the valve into the port and the exhaust gas is discharged from the opposite end of the valve into the exhaust manifold.

The valve or valve units are flexibly connected so that a close bearing surface will always be maintained between the valve and the valve housing. The valve is also so constructed as to be flexible, thereby providing a structure adapted to compensate for expansion or distortion. The valve mechanism also includes couplings between certain of the valves so constructed as to allow a limited endwise movement of the valve to permit expansion thereof.

Means is also provided for vaporizing or volatilizing portions of the intake mixture which are unvolatilized, this means being constructed to by-pass these portions into a loop disposed in juxtaposition with reference to the exhaust manifold. The loop has a valve therein for admitting air in any desired quantity to facilitate the vaporizing of the unvolatilized portion of the mixture and to produce a mixture having the correct proportion of air and gas.

The intake manifold is so arranged and the valves are so relatively positioned that the length of the path of the intake mixture from the carburetor to all of the cylinders is the same.

The cylinder heads are dished and the piston heads are correspondingly dished, thereby producing a combustion space curved in section or having a shape approximating an oblate spheroid. The port leading through the cylinder head from the valve housing to the cylinder enters the cylinder at such an angle that the incoming gas will impinge against the curved surface of the piston head and turbulence will thereby be produced in the combustion space. This turbulence effects a thorough and complete mixture of the gas and air, thereby producing a homogeneous or uniform mixture and preventing a stratified or irregular rate of burning of the mixture or flame propagation. Further details of the invention will appear from the following description.

The invention may be incorporated in any form of multi-cylinder internal combustion engine and in the particular embodiment illustrated a four cylinder engine is shown comprising cylinders A, B, C and D.

The cylinder heads are formed in a single casing 20 and the heads are dished as shown at 21. A piston 22 is mounted in each cylinder and each piston head is also dished as shown at 23, the dished cylinder head and dished piston head forming a combustion space which has the section as shown in Fig. 11 of an ellipse.

The valve housing 24 is formed integral with the casing 20 and communicates with the cylinders through elongated ports or passages 25 which extend through the valve housing and cylinder heads 21. As shown particularly in Fig. 5 and in Figs. 11 to 14 inclusive, the port 25 is disposed at an angle to the dished surface of the cylinder head and directs the intake gas into the combustion chamber at such an angle that this gas will impinge against or strike the dished head 23 of the piston, thereby creating a condition of turbulence in the combustion space. The turbulence will effect a thorough mixture of the gas and air and will produce a uniform and homogeneous mixture as hereinbefore set forth. The port opening 25 is also so proportioned as to depth and width as to maintain the velocity of the intake mixture and to cause the port to act as a nozzle and direct the mixture against the curved surface of the piston head, producing great turbulence.

Spark plugs 28 are preferably secured to the cylinder heads in the position shown in Figs. 5 and 11 to 14 since in this position the plugs are accessible and are out of line with moving parts which might throw oil on the plugs.

The cylinder heads and the valve housing are surrounded by a water jacket 26 and these parts, therefore, are effectively cooled. The water manifold 27 communicates with the jacket 26 and conducts the water in the usual way to the radiator. The cylinders also have the usual jackets 26 which communicate with the jacket of the cylinder head and valve housing.

The combustible mixture is conducted to the valve housing through an intake manifold 30 which is connected at 31 and 32 to the housing and the manifold receives the mixture from a carburetor in the usual manner. Particular attention is directed to the fact that the manifold 30 is comparatively short and, therefore, the gas does not have to travel through a long path before it reaches the valve housing. It will be seen from Fig. 1 that the ends 31 and 32 of the intake manifold are connected to the housing below the main portion of the housing and conduct the gas to a position intermediate the two pairs of cylinders A—B and C—D and thus the gas is conducted through the same length of path to all of the cylinders.

The exhaust gas is led from the two end cylinders at 35 and 36 into conduits 37 and 38 and is led from the two central cylinders B and C through a common exhaust port 39 from the valve housing. The port 39 leads into an exhaust conduit 40.

Figure 2:
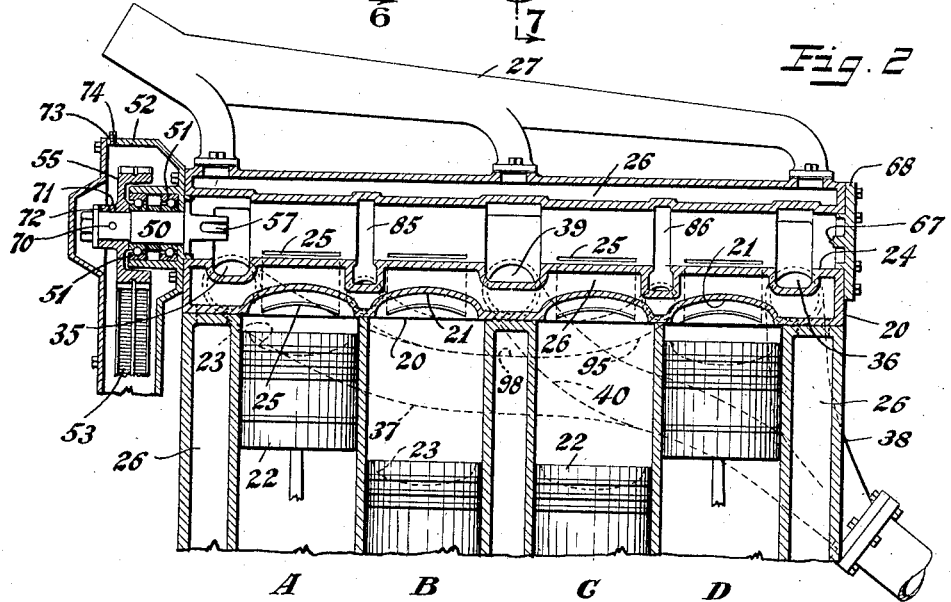
Fig. 2 is a vertical sectional elevation of the engine shown in Fig. 1, the valves not being shown in this view.

The valve mechanism for controlling the admission of the intake gas from the intake manifold into the cylinder ports 25 and for controlling the emission or discharge of the exhaust gas from these ports into the exhaust manifold comprises a plurality of valves or valve units 45, 46, 47 and 48. These valves are disposed end to end in the valve housing 24 as shown in Fig. 1 and in the particular form of the invention shown the valve mechanism is driven from a shaft 50 mounted in bearings 51 and carried by a casing 52 secured as shown in Fig. 2 to one end of the casing 20. The shaft 50 can be driven in any desired manner and as illustrated is driven by a chain 53 which operatively connects a gear 54 on the crank shaft to a gear 55 on the valve shaft. In the form of the invention shown the valve shaft is driven at a two to one ratio.

It will be understood that the valve mechanism can be driven, if desired, by gearing secured to the central portion of the shaft or in any other suitable manner.

The valve 45 is coupled to the shaft 50 by a bifurcated end 56 of the valve which engages a bifurcated end 57 of the shaft 50.

Figure 3:
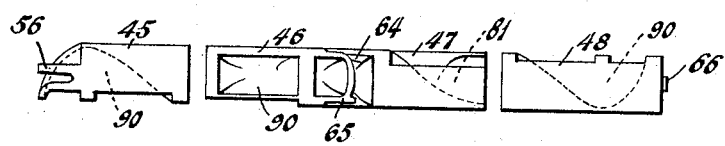
Figure 3 is an elevational view illustrating the valves in position to function in the engine as shown in Fig. 2.

As shown particularly in Figs. 1 and 3 the valves 45 and 46 and the valves 47 and 48 are spaced apart. These valves are operatively connected by means of coupling members 60 having two pairs of offset end portions 61 and 62. The offset portions 61 engage and seat in recesses 63 formed in the end of one of the valves and the offset portions 62 seat in corresponding recesses formed in the end of the other valve. These coupling members are preferably formed of spring steel.

The valves 46 and 47 are connected as shown in Fig. 1 by a bifurcated end portion 64 formed on the valve 47 and a bifurcated end portion 65 formed on the valve 46.

The end valve 48 may have a lug 66 formed thereon adapted to be engaged by a stud 67 projecting inwardly from an end plate 68 which closes the end of the valve housing.

From the foregoing description of the operative connections between the valves it will be evident that any necessary longitudinal expansion of the valve mechanism is provided for and will be automatically taken up by the connections without in any way interfering with the operation or driving of the valve mechanism.

In order to effect proper timing of the valve mechanism the shaft 50 has an aperture 70 therein accessible through an opening 71 in the hub 72 of the gear 55 and through an opening 73 in the casing 52. A tool can be inserted through the openings 73 and 71 into the opening 70 in the shaft and when the piston in cylinder A is on top dead center of its firing stroke and the hole 70 of the shaft is in position to receive the tool the valve mechanism can be coupled to the shaft 50 and the valves will be properly timed. The opening 73 is normally closed by a plug 74.

The valve passages are so constructed that the valves of the cylinders in their firing order, namely A, B, D and C, will be coupled together 90 degrees apart or, in other words, the valve 46 will be coupled to the valve 45 in a position 90 degrees from the position of the valve 45 and so forth. In this way, the valve mechanism can be easily and readily assembled in operative position and the valves will be properly timed. It will be evident that by removing the plate 68, the valve mechanism can be readily withdrawn from its housing without in any way interfering with the remaining portions of the engine or dismantling any of the other parts thereof.

The construction of the valves is clearly shown in Fig. 9. From this showing, it will be seen that the valve is open at one end 80 and this opening leads into a passage 81 between edges 82 and 83 which determine the opening and closing of the intake passage 81. The passage 81 is curved and directs the gas from the open end 80 downwardly by a deflecting surface 84 through the opening between the edges 82 and 83 into the port 25 leading to the cylinder.

Referring to Fig. 1, it will be seen that the valves 45 and 46 are disposed with their open ends positioned end to end and thus the intake gas or combustible mixture is led into these two valves from a common chamber 85 which receives the gas from the intake manifold. This description also applies to the valves 47 and 48 which receive the combustible mixture from a common chamber 86.

Each valve also has an exhaust passage 90 therein. This passage receives the gas from the port 25 through an opening between edges 91 and 92 and directs the gas outwardly by a deflecting surface or passage 93. Attention is directed to the fact that the gas is discharged from the valve at the end opposite to that which receives the intake gas. Furthermore, the exhaust gas heats the common wall between the passages 81 and 90 and, therefore, heats the incoming gas and the incoming gas on the other hand cools the valves. The surface 105 of the valve registers with the port opening 25 during the compression and firing strokes.

From the preceding description of the valve it will be noted that the hot exhaust gas does not at any time pass over the bearing surface of the valve and the exhaust gas is directed away from the valve chamber by means of the deflecting surface 93. It will also be noted that the mixture passes into the cylinders through an unobstructed path and is exhausted from the cylinders in the same manner due to the particular form of the intake and exhaust passages in the valve and to the relative locations of the intake and exhaust manifolds and the formation of the ports 25. The construction of the exhaust passage in the valve gives as near as possible a "no valve" condition—i. e. exhaust direct from the cylinder to the air—and effects a rapid pressure drop and consequently a rapid heat drop. The latter is also promoted by the curvature of the valve surface 93 at the exhaust end thereof.

The intake and exhaust passages cause a stream line passage of the gas to and from the cylinder.

It often happens that the intake gas is not thoroughly carbureted or atomized and for this reason in the usual type of engine unvolatilized gas reaches the cylinder. This is prevented in the persent design by providing a by-pass for such unvolatilized gas in which the gas can be volatilized and mixed with the desired proportion of air. In the particular form of the invention shown, the by-pass consists of a loop 95 which is secured as shown at 96 and 97 to the valve housing in a position opposite to the connection of the ends 31 and 32 of the intake manifold thereof. As shown in Fig. 2 the intermediate portion of the loop 98 is disposed in juxtaposition to the exhaust manifold conduit 37 and is thus heated thereby. In order to admit air to the loop 95, a port 99 is formed therein and a valve 100 is mounted on the loop and controls the opening through the port. The valve 100 can be controlled by a rod 101 leading to the dash or instrument board of the vehicle.

Since the loop 95 is positioned with its ends directly opposite the ends of the intake manifold any unvolatilized gas will be thrown into the loop directly through the valve housing. In the loop this gas will be heated by the exhaust manifold and can be mixed with the desired proportion of air and the mixture thus formed will be drawn out of the loop by suction and into the cylinders. The construction and location of the loop avoids banking of the gas when the valve intake is closed since the gas will pass directly through the housing into the loop. The gas in the loop will always be kept in motion when the engine is running since the suction from the cylinders is communicated to the loop—thus all inertia effects in the intake are damped out or avoided.

The operation of the valve structure can be clearly seen from the illustration in Figs. 11, 12, 13 and 14.

In Fig. 11 the piston has just finished its exhaust stroke and is about to begin the intake stroke. The valve is rotating in the direction of the arrow and the intake passage 81 is about to register with the port 25. In Fig. 12 the intake stroke has been completed and the surface 105 of the valve is in registration with and closes the port 25. The piston is about to start the compression stroke. In Fig. 14 the compression stroke has been completed and the surface 105 of the valve is still in registration with the port opening 25. The firing stroke is about to commence. In Fig. 13 the firing stroke has been completed and the exhaust passage 90 is in registration with the port opening 25 and the exhaust stroke is commencing. Figs. 1 to 11 inclusive illustrate the positions of the valve mechanism in the successive cylinders A, B, C and D and these cylinders fire in the order A, B, D, C.

From the foregoing specification it will be evident that the engine constructed as described will be efficient and quiet in operation and that maximum power will be obtained therefrom for the fuel utilized therein. The valve mechanism will always be exactly timed and the operation thereof will not be hindered in any way by warping or distortion. The relative location of the intake and exhaust passages in the valve and of the intake and exhaust manifolds result in a substantially perfect gas and heat balance for all the cylinders. Furthermore, the form of the valve and the intake and exhaust passages therein effect relatively long periods for admitting and exhausting the gas, but also effect a quick opening and closing of the passages. The positive drive of the valve, and the valve structure enable the operation of the valve at very high speeds without impairing its efficiency. By reason of the particular arrangement of the parts, the valve housing and valves can be effectively cooled either by water cooling or by air cooling since the water jacket can be omitted and radiating fins can be directly secured to the valve housing.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. An internal combustion engine comprising a plurality of cylinders, a valve housing mounted thereon, a port for each cylinder communicating with said housing, an intake manifold and an exhaust manifold connected to and communicating with said housing, valve mechanism rotatably mounted in said housing and comprising a plurality of operatively connected valve units, one for each cylinder, each unit having a passage adapted to connect the intake manifold and cylinder port and a passage adapted to connect the cylinder port and exhaust manifold, the intake passages in adjacent valve units communicating with a common chamber, the adjacent ends of said valve units being connected by couplings constructed and arranged to permit longitudinal expansion of said units.

2. An internal combustion engine comprising a plurality of cylinders, a valve housing mounted thereon, a port for each cylinder communicating with said housing, valve mechanism rotatably mounted in said housing and comprising a plurality of operatively connected valve units, one for each cylinder, each unit having a passage adapted to connect the intake manifold and cylinder port and a passage adapted to connect the cylinder port and exhaust manifold, the intake gas entering each unit at one end thereof and the exhaust gas leaving each unit at the opposite end thereof, the exhaust passage of each valve unit extending longitudinally of the valve beyond the end of the intake passage and having a deflecting surface constructed and arranged to close the end of the valve and deflecting the exhaust gas laterally from the valve unit.

3. An internal combustion engine comprising a plurality of cylinders, a valve housing mounted thereon, a port for each cylinder communicating with said housing, valve mechanism rotatably mounted in said housing and comprising a plurality of operatively connected valve units, one for each cylinder, each unit having a passage adapted to connect the intake manifold and cylinder port and a passage adapted to connect the cylinder port and exhaust manifold, the valve units being so constructed and arranged that the mixture enters adjacent units at the adjacent ends thereof and the exhaust gas leaves adjacent units at the opposite ends thereof, the discharge end of each valve being closed by a deflecting surface constructed and arranged to deflect the gas laterally from the valve and valve casing.

4. An internal combustion engine comprising a plurality of cylinders, a valve housing mounted thereon, an intake manifold communicating with said housing, ports leading from said cylinders to said housing, a plurality of rotary valves in said housing, said valves being constructed and arranged to receive the combustible mixture at one end thereof and to discharge the exhaust gas at the other end thereof, the intake ends of adjacent valves being disposed end to end, and the discharge ends of the valves having an end surface constructed to deflect the discharged gas and direct the gas laterally away from the valve.

5. An internal combustion engine comprising a plurality of cylinders, a valve housing mounted thereon, an intake manifold communicating with said housing, ports leading from said cylinders to said housing, a plurality of rotary valves in said housing, said valves being constructed and arranged to receive the combustible mixture from one end thereof and to discharge the exhaust gas at the other end thereof, the intake ends of adjacent valves being spaced apart and disposed end to end and the discharge ends of the valves having an end surface constructed to deflect the discharged gas and direct the gas laterally away from the valve.

6. An internal combustion engine comprising a plurality of cylinders, a valve housing mounted thereon, a valve for each cylinder mounted in said housing, a port leading to each cylinder from said housing, each of said valves having a passage for conducting the combustible mixture to the cylinder and a passage for conducting the exhaust gas from the cylinder, and the discharge ends of the valves having an end surface constructed to deflect the discharged gas and direct the gas laterally away from the valve.

7. An internal combustion engine comprising more than two and an even number of cylinders arranged side by side, a valve housing mounted on said engine, a plurality of valves in said housing, one for each cylinder, a port leading to said housing from each cylinder, said valves being spaced apart in said housing, each valve having a passage for conducting the combustible mixture to the cylinder port and a passage for conducting exhaust gas away from said port and an intake manifold having a conduit communicating with spaces alternately between the valves, the intake passages in said valves being disposed end to end and receiving the combustible mixture from a common chamber and conduit.

8. An internal combustion engine comprising a plurality of cylinders, a valve housing mounted thereon, each cylinder having a port communicating with said housing, a rotary valve in said housing for controlling the admission of the gas to each port and the exhaust of the gas from each port, flexible resilient driving connections between said valves and means for driving said valves.

9. A substantially cylindrical rotary valve for internal combustion engines having an opening in one end only, a curved gas intake passage leading from the opening in the end and adapted to direct the gas downwardly and a curved exhaust passage in said valve adapted to direct the exhaust gas outwardly from the end of the valve opposite the intake end thereof.

10. A substantially cylindrical rotary valve having one end only open, a curved gas intake passage leading from the open end and adapted to direct the intake gas downwardly into a cylinder port and a curved exhaust passage adapted to receive the exhaust gas intermediate the ends of the valve and to discharge the exhaust gas at the end of the valve opposite the open end thereof.

11. An internal combustion engine comprising a plurality of cylinders, a valve housing mounted thereon, a port leading from each cylinder to said housing, an intake manifold communicating with said housing, valve mechanism in said valve housing comprising a plurality of valves, the valves being spaced apart at the points of communication of the intake manifold with the valve housing and means communicating with said valve housing at points opposite the points of communication of the intake manifold therewith for vaporizing unvolatilized portions of the intake mixture.

12. An internal combustion engine comprising a plurality of cylinders, a valve housing mounted thereon, a port leading from each cylinder to said housing, an intake manifold communicating with said housing, valve mechanism in said valve housing comprising a plurality of valves, the valves being spaced apart at the points of communication of the intake manifold with the valve housing, and means including a loop communicating with said valve housing at points opposite the points of communication of the intake manifold therewith for vaporizing unvolatilized portions of the intake mixture.

13. An internal combustion engine comprising a plurality of cylinders, a valve housing mounted thereon, a port leading from each cylinder to said housing, an intake manifold communicating with said housing, valve mechanism in said valve housing comprising a plurality of valves, the valves being spaced apart at the points of communication of the intake manifold with the valve housing, and means including a loop having an air intake port, communicating with said valve housing at points opposite the points of communication of the intake manifold therewith for vaporizing unvolatilized portions of the intake mixture.

14. An internal combustion engine comprising a plurality of cylinders, a valve housing mounted thereon, a port leading from each cylinder to said housing, an intake manifold communicating with said housing, valve mechanism in said valve housing comprising a plurality of valves, the valves being spaced apart at the points of communication of the intake manifold of the valve housing, and means including a loop and a valve for controlling said port, communicating with said valve housing at points opposite the points of communication of the intake manifold therewith for vaporizing unvolatilized portions of the intake mixture.

15. An internal combustion engine comprising a plurality of cylinders, a valve housing mounted thereon and communicating with each of said cylinders, valve mechanism in said housing, an intake manifold communicating with said housing at spaced points thereon, an exhaust manifold communicating with said housing and means disposed in juxtaposition to said exhaust manifold and communicating with said housing at points opposite the points of communication of the intake manifold therewith for vaporizing unvolatilized gas fed to said housing by the intake manifold.

16. An internal combustion engine comprising a plurality of cylinders, a valve housing mounted thereon and communicating with each of said cylinders, valve mechanism in said housing, an intake manifold communicating with said housing at spaced points thereon, an exhaust manifold communicating with said housing and means disposed in juxtaposition to said exhaust manifold and communicating with said housing at points opposite the points of communication of the intake manifold therewith for vaporizing unvolatilized gas fed to said housing by the intake manifold, said vaporizing means comprising a loop connected at its ends to the valve housing.

17. An internal combustion engine comprising a plurality of cylinders, a valve housing mounted thereon and communicating with each of said cylinders, valve mechanism in said housing, an intake manifold communicating with said housing at spaced points thereon, an exhaust manifold communicating with said housing and means disposed in juxtaposition to said exhaust manifold and communicating with said housing at points opposite the points of communication of the intake manifold therewith for vaporizing unvolatilized gas fed to said housing by the intake manifold, said vaporizing means comprising a loop connected at its ends to the valve housing, said loop having an air admission port therein.

18. An internal combustion engine comprising a plurality of cylinders, a valve housing mounted thereon and communicating with each of said cylinders, valve mechanism in said housing, an intake manifold communicating with said housing at spaced points thereon, an exhaust manifold communicating with said housing and means disposed in juxtaposition to said exhaust manifold and communicating with said housing at points opposite the points of communication of the intake manifold therewith for vaporizing unvolatilized gas fed to said housing by the intake manifold, said vaporizing means comprising a loop connected at its ends to the valve housing, said loop having an air admission port therein and valve means to control the admission of air to said port.

19. A substantially cylindrical rotary valve for internal combustion engines having an opening in one end only, a curved gas intake passage extending longitudinally of the valve leading from the opening in the end and adapted to direct the gas downwardly and a curved exhaust passage in said valve extending longitudinally of the valve adapted to direct the exhaust gas outwardly from the end of the valve opposite the intake end thereof.

20. An internal combustion engine comprising a plurality of cylinders, a valve housing, valve mechanism therein, an intake manifold communicating with said housing and means communicating with said housing independently of said manifold for vaporizing unvolatized portions of the intake mixture.

21. An internal combustion engine comprising a plurality of cylinders, a valve housing, valve mechanism therein, an intake manifold communicating with said housing, an exhaust manifold connected to said housing, and means communicating with said housing independently of the intake manifold and positioned to receive heat from the exhaust manifold for vaporizing unvolatilized portions of the intake mixture.

22. An internal combustion engine comprising a plurality of cylinders, a valve housing, valve mechanism therein, an intake manifold communicating with said housing, a loop communicating with said housing and adapted to receive unvolatilized portions of the intake mixture, and an exhaust manifold connected to said housing, said loop having a low portion superposed on said exhaust manifold.

23. An internal combustion engine comprising a plurality of cylinders, means for conducting a combustible mixture to said cylinders, means for exhausting the burnt gases from said cylinders and means separate and distinct from the intake means adapted to receive and volatilize unvolatilized portions of the mixture, said means consisting of a by-pass between the mixture conducting means and the cylinders.

24. An internal combustion engine comprising a plurality of cylinders, means for conducting a combustible mixture to said cylinders, means for exhausting the burnt gases from said cylinders and means separate and distinct from the intake means adapted to receive and volatilize unvolatilized portions of the mixture, said means consisting of a by-pass between the mixture conducting means and the cylinders, and by-pass being constructed and arranged to receive heat from the exhaust gas conducting means.

25. An internal combustion engine comprising a plurality of cylinders, an intake manifold, valve mechanism for directing the gas from the intake manifold into the cylinders and for conducting the exhaust gas away from the cylinders, an exhaust manifold adapted to receive the gas from said valve mechanism and means including a by-pass separate and distinct from the intake manifold adapted to receive unvolatilized portions of the intake mixture for vaporizing said portions, said by-pass being positioned adjacent the exhaust manifold and adapted to receive heat therefrom.

26. An internal combustion engine comprising a plurality of cylinders, a valve housing mounted thereon, each cylinder having a port communicating with said housing and valve mechanism mounted in said housing, said mechanism having intake and exhaust passages adapted to register with said ports, the intake passages extending longitudinally and being curved in section and constructed and arranged to receive the intake gas at one end of the passage and conduct the gas to the cylinder port and the exhaust passages extending longitudinally and being adapted to receive the gas from the cylinder port and to discharge the gas laterally from the valve mechanism at points spaced longitudinally from the intake passage of the valve mechanism, the longitudinal edges of the passages being disposed substantially parallel to the axis of rotation of the valve mechanism.

27. An internal combustion engine comprising a plurality of cylinders, a valve housing mounted thereon, a port for each cylinder establishing communication between the cylinder and housing, valve mechanism mounted in said housing for controlling said ports, an intake manifold connected to said housing in a plane disposed below the main portion of the housing and a loop connected to said housing on the side opposite the intake manifold and adapted to receive unvolatilized portions of the intake mixture.

28. An internal combustion engine comprising a plurality of cylinders, a valve housing mounted thereon, a port for each cylinder establishing communication between the cylinder and housing, valve mechanism mounted in said housing for controlling said ports, an intake manifold connected to said housing in a plane disposed below the main portion of the housing, an exhaust manifold connected to and communicating with said housing and a loop connected to said housing on the side opposite the intake manifold and adapted to receive unvolatilized portions of the intake mixture, said loop being disposed in juxtaposition to said exhaust manifold.

29. An internal combustion engine comprising a plurality of cylinders, a valve housing, valve mechanism therein, an intake manifold communicating with said housing and means communicating with said valve housing and disposed on the opposite side of said housing from the intake manifold for vaporizing unvolatilized portions of the intake mixture.

30. In an internal combustion engine, a cylinder, a valve housing mounted thereon, a cylinder head formed integral with said housing and an elongated port opening between said housing and said cylinder and extending through the cylinder head, said port being disposed at an acute angle to the cylinder axis and relatively narrow in width and extending across the major portion of the diameter of the cylinder head thereby maintaining the velocity of the intake mixture as it passes from the housing to the cylinder.

31. A substantially cylindrical rotary valve for internal combustion engines having one end open and an elongated rectilinear passage curved in longitudinal section and communicating with the open end for admitting the intake gas and an elongated rectilinear exhaust passage curved in longitudinal section for emitting the exhaust gas, the wall of the exhaust passage closing the other end of the valve.

32. A substantially cylindrical rotary valve having one end open, a curved gas intake passage leading from the open end and adapted to direct the intake gas downwardly into a cylinder port, the longitudinal edges of said passage being disposed parallel to the axis of rotation of the valve and a curved exhaust passage adapted to receive the exhaust gas from a cylinder port and to discharge the exhaust gas laterally from the valve housing, the longitudinal edges of said passage being disposed parallel to the axis of rotation of the valve.

33. An internal combustion engine comprising a plurality of cylinders, a valve housing, valve mechanism therein, an intake manifold communicating with said housing, a loop communicating with said housing and adapted to receive unvolatilized portions of the intake mixture, and an exhaust manifold connected to said housing, said loop having a low portion superposed on said exhaust manifold, and valve controlled means for admitting air to said loop.

34. An internal combustion engine comprising a plurality of cylinders, a valve housing, valve mechanism therein, an intake manifold communicating with said housing and means communicating with said housing for vaporizing unvolatilized portions of the intake mixture, and valve controlled means for admitting air to said vaporizing means.

35. In an internal combustion engine, a cylinder, a dished cylinder head thereon, a valve housing mounted on and disposed above said head, a piston in the cylinder having a dished head, an elongated narrow unobstructed port extending from the valve housing through the top of the cylinder head and across the major portion of the diameter of the cylinder, said port being inclined to the vertical.

36. A substantially cylindrical rotary valve for internal combustion engines having an open end and an intake passage in the valve leading from the open end longitudinally of the valve and an exhaust passage in the valve angularly displaced from the intake passage, extending longitudinally of the valve to a position beyond the intake passage and discharging laterally from the valve.

37. A valve for internal combustion engines, an open end and a longitudinally curved deflecting surface for deflecting intake gas downwardly into a cylinder and having a deflecting surface spaced from said first named surface for deflecting exhaust gas outwardly and laterally from the valve.

38. A substantially cylindrical rotary valve having one end open, a curved gas intake passage leading from the open end and adapted to direct the intake gas downwardly into a cylinder port, the longitudinal edges of said passage being disposed parallel to the axis of rotation of the valve and a curved exhaust passage adapted to discharge the exhaust gas from the valve housing, the longitudinal edges of said passage being disposed parallel to the axis of rotation of the valve, the discharge end of said exhaust passage being disposed beyond the end of the intake passage and adapted to direct the exhaust gas laterally from the valve.

In witness whereof, I have hereunto set my hand this 25th day of June, 1924.

ALBERT R. LONG.